Oct. 6, 1925.

J. A. SKOGLUND 1,555,888

HEADLIGHT FOR AUTOMOBILES

Filed July 2, 1924

Witnesses
Paul A. Viersen
William R. Piper

Inventor
J. A. Skoglund
H. J. Sanders
By Atty.

Patented Oct. 6, 1925.

1,555,888

UNITED STATES PATENT OFFICE.

JOHN A. SKOGLUND, OF DETROIT, MICHIGAN.

HEADLIGHT FOR AUTOMOBILES.

Application filed July 2, 1924. Serial No. 723,847.

*To all whom it may concern:*

Be it known that I, JOHN A. SKOGLUND, a subject of the King of Sweden, residing at Detroit, in the county of Wayne and State of Michigan, have invented certain new and useful Improvements in Headlights for Automobiles, of which the following is a specification.

This invention relates to improvements in headlights for automobiles. Its chief object is to provide headlights which may be adjusted to swing when the direction of the machine is changed and which will be maintained in parallelism with the front wheels of the machine. A further object is to provide a simple device of this type that is efficient in operation and cheap to manufacture. With the foregoing and other objects in view the invention consists in the combination and arrangement of parts to be hereinafter fully described, pointed out in the appended claim and illustrated in the accompanying drawing which forms a part of this application and in which—

Like reference characters denote corresponding parts in both views.

Figure 1:
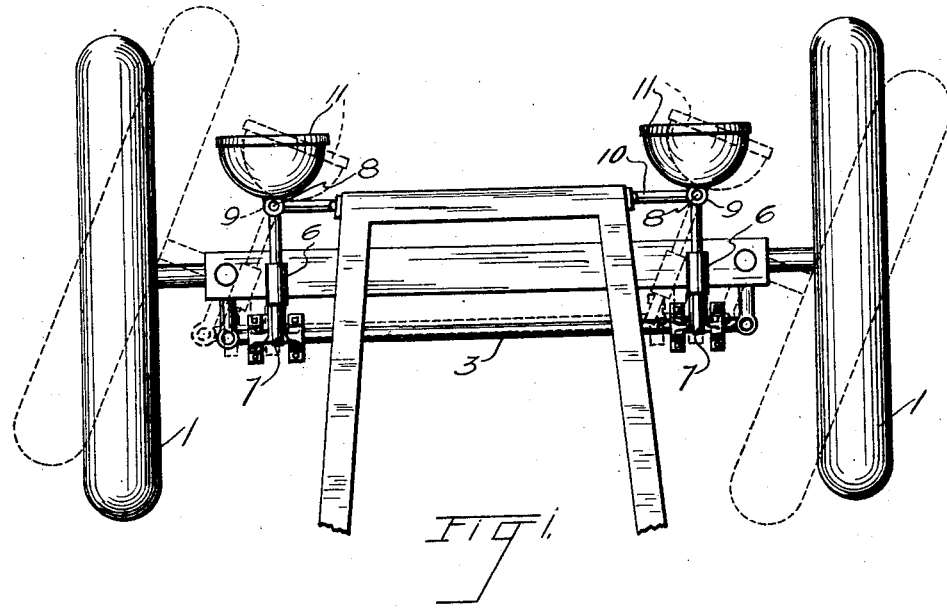
Fig. 1 is a fragmentary plan view of an automobile illustrating the application of my improved headlights.
Figure 2:
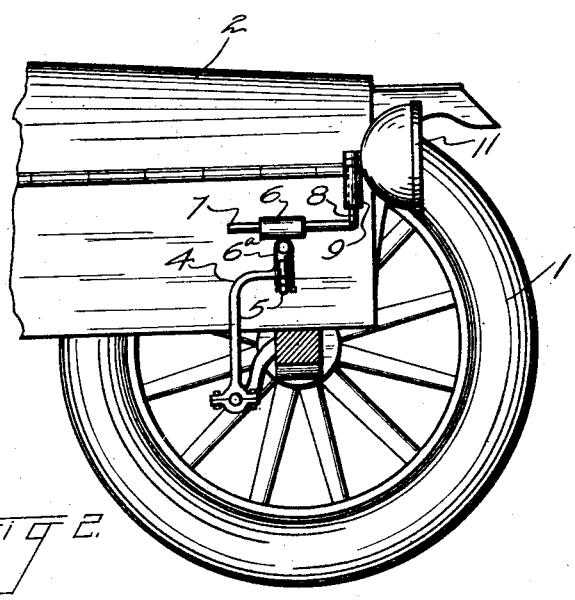
Fig. 2 is a fragmentary view in side elevation of an automobile illustrating the application of the headlights.

The reference numeral 1 denotes the front wheels of an automobile, 2 the body and 3 the steering rod. To each end of the steering rod I secure a bracket 4 to which the stem 5 of a sleeve 6 is connected by a swivel joint 6ª. Through the sleeve 6 a rod 7 extends, said rod being movable longitudinally of said sleeve and pivotally connected to the said rod 7 is the upstanding rod 8 which is slidably supported in another sleeve 9 which is secured by a stem 10 to the body of the machine, the upper end of the said rod 8 carrying the lamp 11.

As the wheels 1 travel over rough roads the jar to the lamp is broken due to the fact that the bracket 4 and sleeve 6 with the rod 7 will move in a vertical plane with slight jar or jolt to the rod 8. Movement of the rod 7 in a horizontal plane is imparted to the rod 8 thus rotating that rod in its sleeve and turning the lamp 11 as shown in dotted lines in Fig. 1.

What is claimed is:—

In headlights for automobiles, the combination with a steering rod, of a vertically arranged bracket secured thereto, the upper end of said bracket being curved and disposed in a horizontal plane, a horizontally disposed sleeve carried by the end of said bracket in swivelled connection therewith, a rod slidably disposed in said sleeve, a bracket on the automobile body and extending laterally thereof, a vertically arranged sleeve carried by said last named bracket, a rod slidably disposed in said vertically arranged sleeve, pivotal connection between said rods, and a lamp carried by the last named rod and supported on the upper end of said last named sleeve.

In testimony that I claim the foregoing to be my own I have hereto affixed my signature.

JOHN A. SKOGLUND.